J. BRIGGS & J. T. JENKINS.
AUTOMATIC PHONOGRAPH.
APPLICATION FILED FEB. 24, 1916.

1,273,572. Patented July 23, 1918.

INVENTOR
John Briggs
John T. Jenkins

J. BRIGGS & J. T. JENKINS.
AUTOMATIC PHONOGRAPH.
APPLICATION FILED FEB. 24, 1916.

1,273,572.

Patented July 23, 1918.
6 SHEETS—SHEET 6.

WITNESSES:
B. M. Doolin
L. J. Forde

INVENTOR
John Briggs
John T. Jenkins
BY Armst Townsend
ATTORNEY

UNITED STATES PATENT OFFICE.

JOHN BRIGGS AND JOHN T. JENKINS, OF SAN FRANCISCO, CALIFORNIA, ASSIGNORS TO RUSSELL BERKENKAMP, OF SAN FRANCISCO, CALIFORNIA.

AUTOMATIC PHONOGRAPH.

1,273,572.  Specification of Letters Patent.  Patented July 23, 1918.

Application filed February 24, 1916. Serial No. 80,160.

*To all whom it may concern:*

Be it known that we, JOHN BRIGGS and JOHN T. JENKINS, citizens of the United States, residing in the city and county of San Francisco and State of California, have invented new and useful Improvements in Automatic Phonographs, of which the following is a specification.

This invention relates to automatic phonographs; and has for its object to make provision therein for the selective playing or re-playing of any one of a series of records, upon supplying a coin or other token thereto.

In carrying out this object, we employ, in combination, two vertical, rotatable spools or disk records, between which is a reproducer movable up and down by an electrically controlled elevator to a position adjacent to any one of said records, engaging means carried by the rotatable spools to shift the reproducer into playing position with the desired record, said elevator mechanism and shifting means being controlled by means of a series of push-rods, driving mechanism for the elevator and driving mechanism for the rotatable spools, said mechanisms being operated successively by the presence of a coin or token, automatic means for cutting down the initial speed of the rotatable spools, whereby to insure slow and safe engagement of the reproducer with the records, means operable upon the completion of the playing of each record to disengage the reproducer from the record and return it to a neutral position between the spools, means for automatically stopping the operation of the device when the playing is completed, and locking means, in connection with the push-rods, to prevent actuation of the same previous to the dropping of a coin.

One form which our invention may assume is exemplified in the following description and illustrated in the accompanying drawings, in which—

Figure 1:
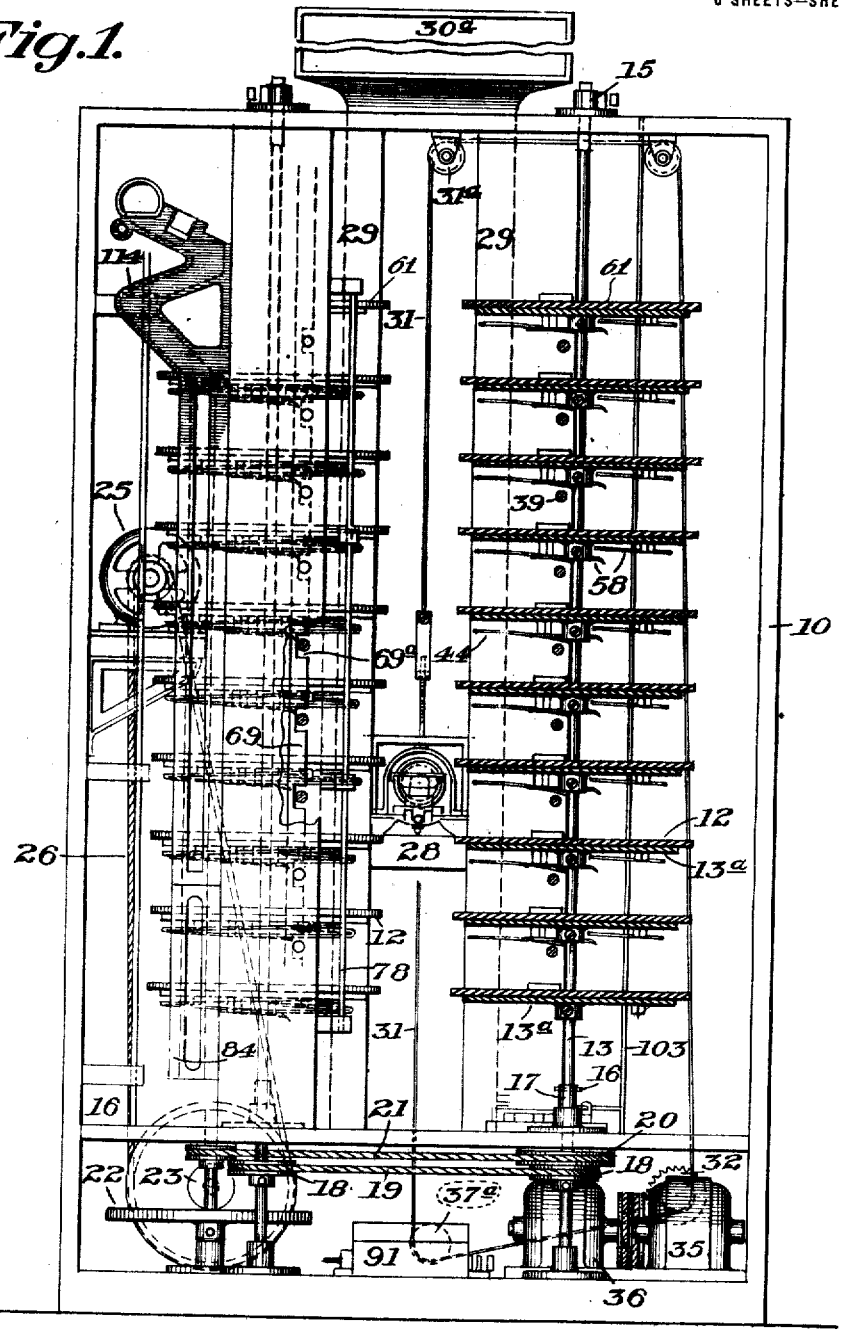
Figure 1 shows a front elevation, partly in section, of a device embodying our invention.

Referring in detail to the particular form of our device illustrated herewith, we have shown, in Fig. 1, an upright cabinet 10, preferably provided with glass or transparent sides 11, within which the entire operating mechanism of the device is arranged and inclosed. We prefer to employ records 12 of disk shape, and these we arrange in vertically spaced order on upright shafts or spools 13; two of such spools being provided in side by side arrangement and spaced apart to allow a single reproducer 14 to move up and down between the records thereon. We prefer also to employ the diamond or other non-wearing point for the reproducer so as to avoid the complication of means for changing the needle at frequent intervals.

The shafts 13 have fixed upon them supporting tables 13ª for receiving the disk records and are carried detachably in upper bearings 15 and engage at their lower ends each with a clutch pin 16 on a driving element 17, whereby to allow easy removal and replacement of each; it being the plan of operation herein to previously fix the records upon the spools and insert or remove the whole as a unit for making changes in the playing program of the device. For driving the members 17, we employ a pulley wheel 18 on each connected by a belt 19, and on one of said members is an additional driving pulley 20, which, by means of a belt 21, connects with a friction drive disk 22, the latter operated at any desired speed by means of a driving pinion 23 engaging therewith and adjustable on its shaft 24, said driving pinion 23 being operated by an electric motor 25 through a pulley belt 26. As at present arranged both spools operate simultaneously and in the same direction.

Figure 2:
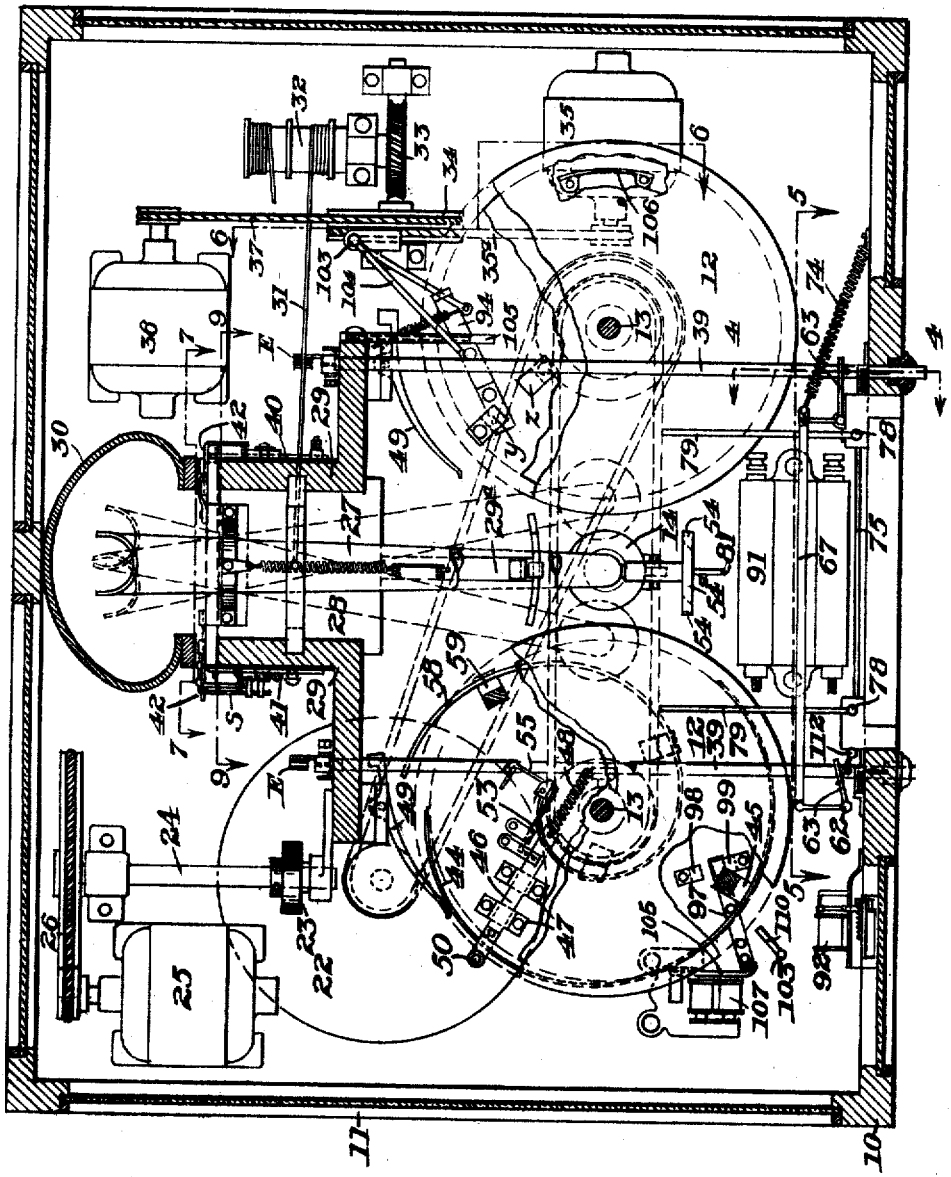
Fig. 2 shows a plan view, in section, of the same.

As best seen in Fig. 2, the tone arm 27 for the reproducer mechanism 14 is pivotally carried upon an elevator block 28, the latter movable up and down between vertically arranged, spaced guides or rails 29. By means of a bracket 29ª the tone arm is held in neutral position between the two sets of records, and a vertically slotted conduit 30 receives the sounds from the tone arm, conveying them to an amplifier 30ª located atop the cabinet. A cable 31, attached above and below the elevator block, runs in opposite directions over pulleys 31ª to a winding drum 32, the latter rotatable in either direction by a worm and screw connection 33 with a double grooved pulley 34. A motor 35, arranged at one side of said pulley and connected therewith by a belt 35ª, drives the same in a direction to hoist the elevator block and tone arm, and a motor 36, at the opposite side of the pulley 34, having a belt connection 37 therewith drives the same in a direction to lower the elevator block. This arrangement of two simple motors we find to be more economical than the provision of a single reversible motor, although it is obvious that the latter may be employed if it is desired to simplify the parts.

Electric controlling switches 38 are arranged on both guide rails 29 at intervals corresponding to the location of the disks 12 and are closed by means of push-rods 39 extending from the front of the cabinet and, in conjunction with down-going elevator trip switches 40 and up-going trip switches 41 arranged on opposite guide rails and automatically tripped by a yielding striker 42 on the elevator block, serve to control the direction and extent of movement of the elevator, causing the tone arm thereon to be moved to a position adjacent the desired record by the manual manipulation of a push-rod corresponding in position thereto, as hereinafter more fully described.

Means are provided beneath each turntable 13ª for shifting the reproducer from its neutral position on the bracket 29ª to playing engagement with the record immediately below, which means are best illustrated in plan in Fig. 2. Included in such means is an inwardly directed segmental cam 44, preferably of wire so as to be deformable and held on the table, near its rear end, with a clip 45 and carried, near its front end, by a radially movable setting bar 46, slidable in keepers 47 fixed upon the table and normally pulled inwardly by a spring 48. A switch lever 49 is pivoted intermediately to the elevator rail adjacent to each turntable and has its forward end movable into the path of a roller 50 fixed upon the setting bar 46, by reason of a yielding connection 51 between its rear end and the adjacent push-rod.

A yielding bell-crank 52, pivoted to the adjacent frame, is connected to the push-rod and has its free end normally lying above the switch lever so that when the rod is moved inwardly said end presses downwardly on the lever and is releasable therefrom when the lever is shifted to form a block therefor, as will hereinafter appear.

Figure 6:
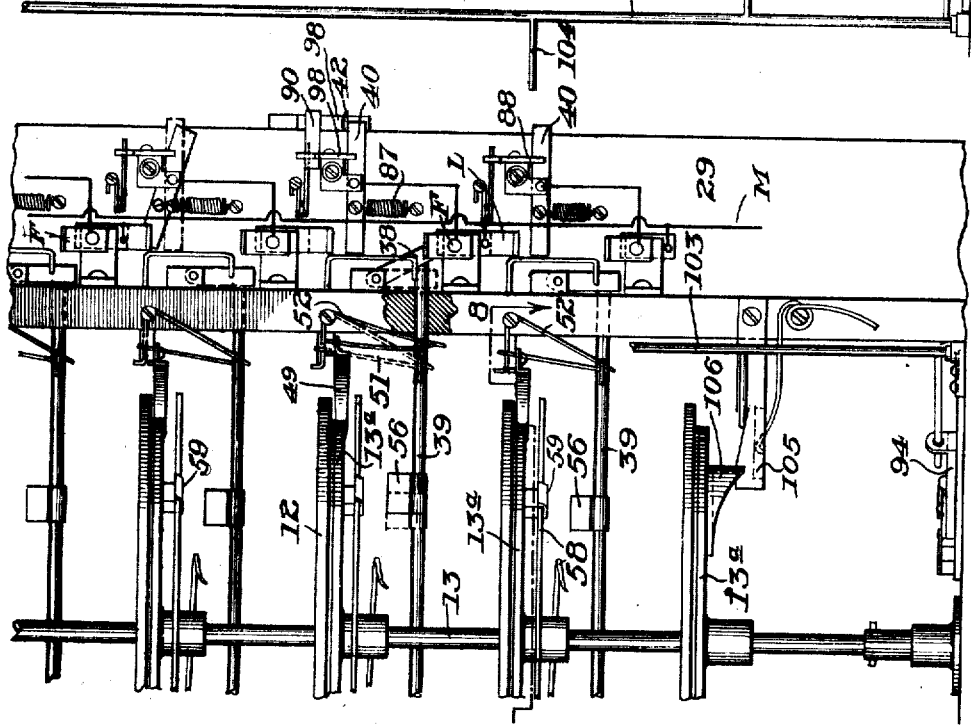
Fig. 6 shows a sectional view taken on the line 6—6 of Fig. 2.
Figure 8:
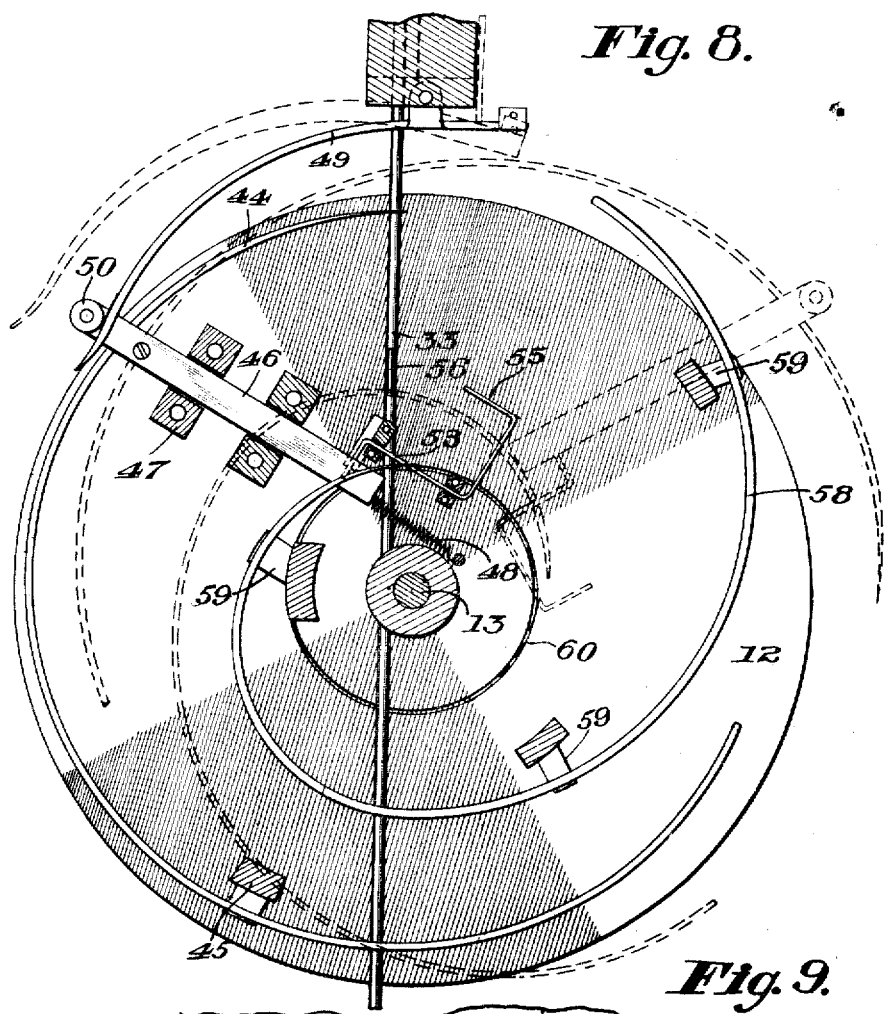
Fig. 8 shows an enlarged view of the lateral shifting mechanism for the reproducer, taken on the line 8—8 of Fig. 6.
Figure 9:
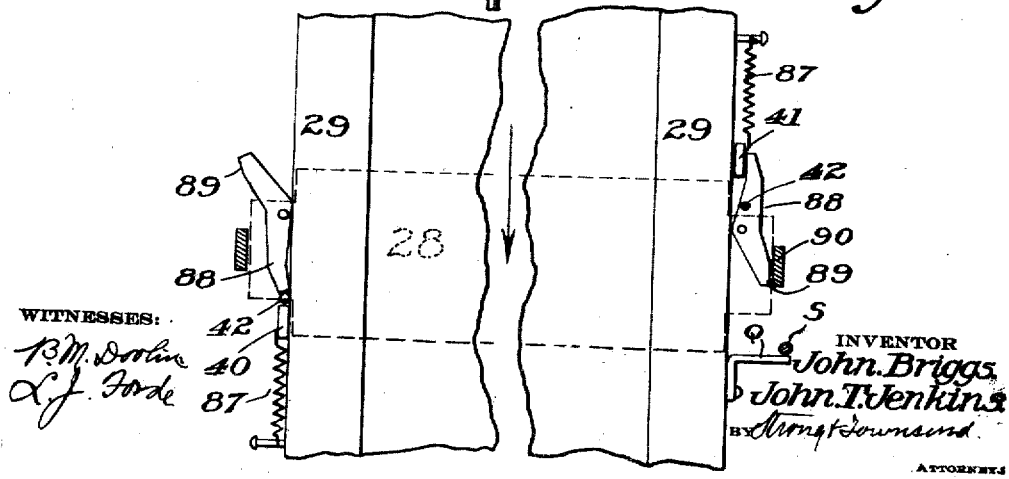
Fig. 9 shows an enlarged view of the trip switch mechanism for the elevator, taken on the line 9—9 of Fig 2.

The roller 50 rides upon the outer surface of the switch lever 49 and causes the setting bar 46 to be pulled outwardly until a spring-pressed latch 53 engages therewith and holds the same in extended position. In such position the forward end of the cam 44 will be projected into the path of a shoulder 54 formed upon a cross arm 54ª, carried by the reproducer, and will engage therewith to pull the reproducer inwardly as the cam is moved around with the record, thus lowering the reproducer and disengaging itself therefrom as its end passes from beneath the shoulder 54. In the meantime a trip device 55, on the latch 53, will have struck a projection 56 on the adjacent push-rod 39 which will cause it to be rocked slightly and release the latch 53, allowing the setting bar 46 to be retracted by the spring 48, thus bringing the the cam 44 back to its original position; the lowering movement of the reproducer into engagement with the record having been sufficient to clear the shoulder 54 thereon from reëngagement with the said cam. Upon the movement of the roller 50 over the rear end of the switch lever 49 the latter will be automatically shifted in a direction to cause its forward end to move outwardly from the record, thereby allowing the free end of the bell-crank 52 to move behind said lever and block its return, whereupon reëngagement of the switch lever with the roller 50 will not recur during the further operation of the record, and release of the switch lever will take place when the push-rod is allowed to move outwardly, throwing the free end of the bell-crank lever above said switch, which operation is best illustrated in Fig. 6. The point of engagement of the needle of the reproducer with the record will be near the periphery of the latter owing to the position of the rear end of the cam 44, which should be such as to insure engagement some time previous to playing.

We provide means, effective at the completion of the playing, to automatically disengage the needle from the record and shift the tone arm back to neutral position on its bracket 29ª. This is in the form of an outwardly directed, spiral cam 58 carried beneath each turntable and fixed thereon by means of clips 59, and this cam has a downturned inner end, and leading from the terminus of the playing groove in the record to a point in line with said end is a special deeply cut groove 60 in the record which we term the universal groove, by reason of the fact that all records adapted for use in this device are so equipped. Thus the reproducer will be carried by its needle entering the universal groove into juxtaposition with the down turned inner end of the cam 58, allowing the latter to engage beneath the shoulder 54 thereon and lift the reproducer from engagement with the record, and, by the sinuosity of the cam, as the turntable continues to rotate the tone arm is shifted back to neutral position. The cam is disengaged from the reproducer by the passage of its outer end from beneath the shoulder. By reason of the fact that our present arrangement contemplates the provision of mechanism beneath a turntable for automatically engaging and disengaging the reproducer with the record immediately below, there will be no such mechanism on the lowermost turntable, but an auxiliary turntable 61 will be provided above upon which no record is carried.

Figure 5:
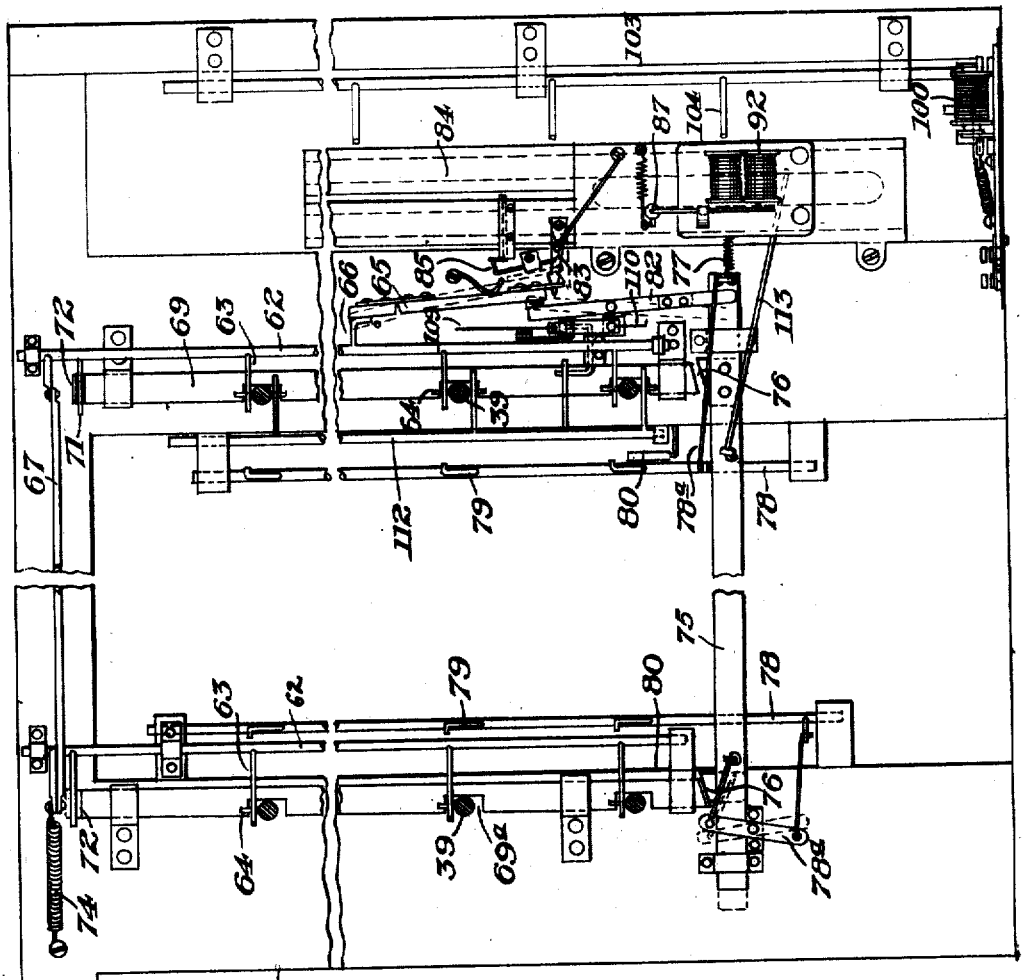
Fig. 5 shows a sectional view, taken on the line 5—5 of Fig. 2.

In order to prevent the manipulation of the push-rods 39, prior to the dropping of a coin, we provide a lock for each series in the form of a vertical rock-shaft 62 carried on the frame of the cabinet near the front thereof and provided with lateral pins 63 to engage with similar pins 64 upon the push-rods, as will be seen by reference to Fig. 5. Normally the rock-shaft 62 is held by a pivoted abutment block 65 engaging with a lug 66 on said shaft, so that the rods are locked against inward movement by reason of the engagement of the pins thereon with the pins on the vertical rock-shaft. The vertical rock-shafts at either side being connected together by a cross-bar 67 for conjoint movement but one abutment block 65 is required, this being located adjacent to the coin slot and adapted for manipulation by the coin, as will hereinafter appear.

Each push-rod 39 is pressed outwardly by a spring 68 so that means must be provided for retaining it inwardly during the operative periods of the device. As best seen in Fig. 5, this means takes the form of a vertically slidable bar 69 for each series of rods carried on the frame and provided with elongated openings 69ª to permit a vertical web 70, fixed upon each rod, to move therethrough when the bar is in raised position, but to be blocked against the side of the opening when the bar is lowered. Both bars are normally held upward, by means of a pin 71, on the adjacent rock-shaft 62 engaging with the lower surface of the out-turned end 72 on the respective bar. Hence as soon as a push-rod 39 is moved inwardly the rock-shafts 62 are turned, leaving the bars 69 free to lower themselves either by gravity or springs 73. One of these will, therefore, drop in front of the web 70 on the push-rod and retain the same in inward position.

The rock-shafts 62, which are returned to normal or locking position by a spring 74 are, during the playing operation, held against return movement by reason of a pin 63 thereon engaging with the pin 64 on the depressed push-rod and the push-rods are all held against movement by the bars 69.

When the playing of a record is completed it is necessary to raise the locking bars 69 to allow the depressed push-rod to be thrown back to normal position and the rock-shafts 62 retracted. This we accomplish by means of a horizontally arranged slidable bar 75, on the lower front portion of the frame, carrying beveled projections 76 that engage with the lower end of each of the locking bars 69. The slide bar 75 is normally positioned, by means of a spring 77, so that the lifting projections thereon are withdrawn from the locking bars; and for moving said horizontal bar to lifting position we employ a pair of vertical rock-shafts 78, one adjacent to each spool of records, and provide each with a series of horizontally projecting arms 79 corresponding in numbers and location to the records on the spool. These shafts 78 have each a connection 78ª with the horizontal bar 75 for operating the latter in one direction and are normally retained by means of the spring 77 connected with said bar where their arms 79 will rest against an abutment 80, in which position they will be within the axial plane of the records.

A projection 81 is carried on the cross-arm 54ª of the reproducer and in moving inwardly, when the reproducer is in playing engagement with the record, will clear the adjacent arm 79, but when being moved outwardly by the spiral cam 58 the reproducer is necessarily elevated to clear its needle from the record, whereupon an engagement takes place between the projection 81 and adjacent arm 79, which causes the rock-shaft 78 to be swung around and, through its connection 78ª, operate the slide bar 75 in a direction to lift the locking bar 69 and free the depressed push-rod; this occurring at the moment of restoring the tone arm to its neutral position. At the same time the rock-shafts 62 will be released, on account of the locking bars 69 disengaging the pins 71, whereupon they will be returned to initial position, and, by reason of a setting lever 82, between the slide bar 75 and abutment block 65, the latter will similarly be moved to position for locking the rock-shafts 62, a spring-actuated trip dog 83 being provided for the purpose of holding the block 65 in locking position. Also, the projection 81, on the reproducer, will free itself from the arm 79 after a certain length of movement has taken place and the latter will be returned to its position of rest against the abutment 80 by the action of the spring 79ª.

Figure 3:
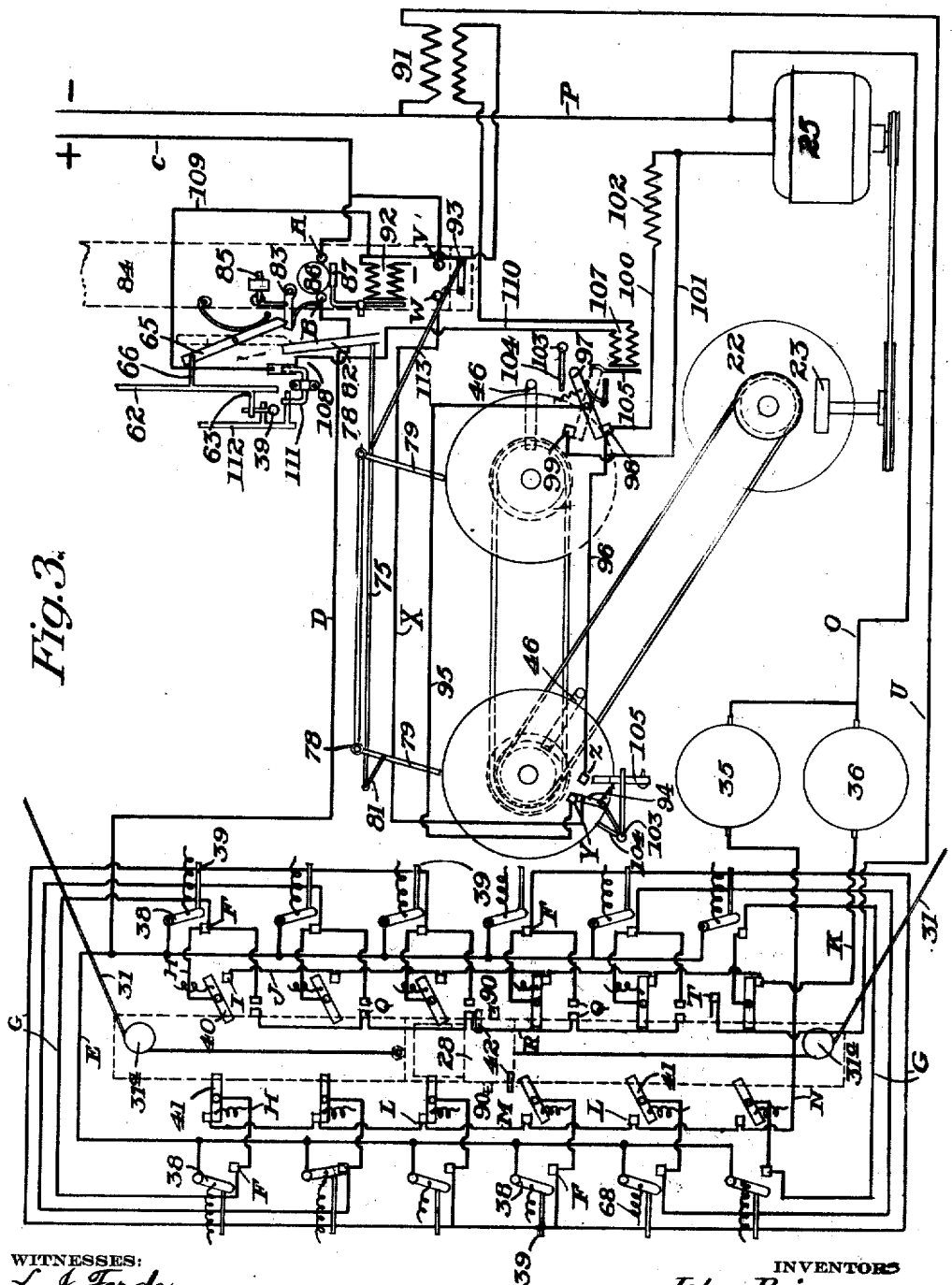
Fig. 3 shows a diagram of a complete device.
Figure 4:
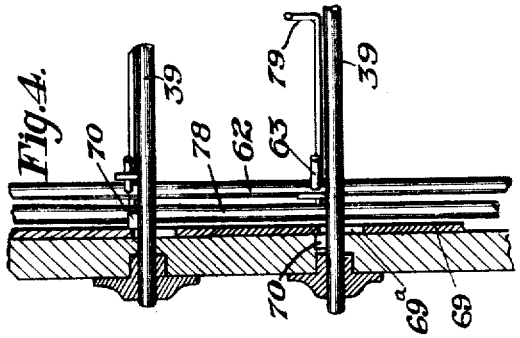
Fig. 4 shows a vertical, central, sectional view of a portion of one set of push-rods and associated mechanism.

The mechanism so far described, which, it will be noted, is highly coördinated, is combined and further coördinated to secure a timed and consecutive operation of the same from a unitary coin-actuated control. We arrange a coin chute 84 at the front of the cabinet, upon which is located (as will be seen in the diagram in Fig. 3), a trip device 85 for the latch 83 adapted to be operated by a falling coin 86 to release the abutment block 65.

Spaced terminals A and B are arranged on said chute and are adapted to be closed by the presence of a coin held therebetween by a movable obstruction 87. To one of these terminals A a main C (marked plus) is connected, while the other terminal has leading from it a conductor D, to which is connected a switch feeder E having connections with each of the controlling switch arms 38 on the elevator frame. Stationary contacts F are provided for the switch arms 38 and are connected across by wires G, each with a corresponding contact F at the opposite side of the elevator. A conductor H connects each contact F also with the adjacent elevator trip switches 40—41. The down-going elevator trip switches 40 are each provided with a spring clip contact device I, which latter are joined in series by a conductor J leading to one of the feed wires K of the lowering motor 36, while the up-going trip switches 41 make contact each with a similar contact device L, all joined in series by a conductor M leading to one of the feed wires N of the hoisting motor 35. These two motors have their return wires O in common leading to the main P (marked minus). The plus and minus designations are used more in a cyclical sense and for the sake of clearness, for, obviously, alternating current may be and preferably is utilized on account of the presence of a transformer in the apparatus.

When, for instance, the elevator is in raised position all of the trip switches 40 beneath the same are closed, and, similarly, if the elevator should be in lowered position all the trip switches 41 above the same would be closed. Thus when any one of the controlling switches 38 is manually closed by depression of a push-rod 39 current from the feeder E passes through the closed switch 38 and thence to the adjacent or opposite trip switch 40—41, depending on whether the elevator is up or down, on account of the trip switches 40 and 41 and contacts F on the same level being in parallel connection through the wires D. From the trip switch 40 or 41 the current passes out to one of the motors 35 or 36. Obviously, if the circuit is through a trip switch 40 that means that the elevator previously was in raised position and the lowering motor will be operated as would be necessary to bring the tone arm to the desired position; and if the circuit is through the trip switch 41, this would indicate a previously lowered position of the elevator and as a consequence the hoisting member will be operated.

Figure 7:
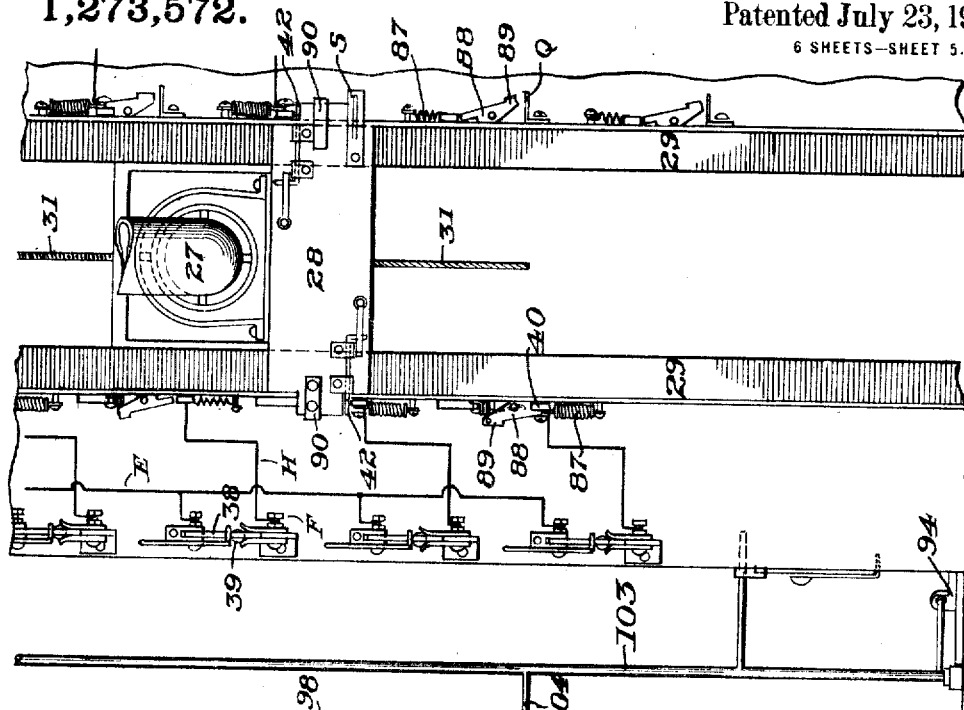
Fig. 7 shows a detail of the elevator trip switch mechanism employed herein, taken on the line 7—7 of Fig. 2.

Such a circuit will endure until the elevator block reaches a position adjacent to the closed controlling switch 38, whereupon the striker 42 thereon will act to trip the closed elevator switch 40—41 and break the circuit through the operating motor. In order, however, that the open elevator trip switch shall not be tripped into closed position before the opposite one is broken, thus causing instant reversal of the elevator, we provide mechanism, such as shown in Fig. 7, where each elevator switch is equipped with a spring 87 to normally maintain it open, and a spring-actuated latch dog 88 is provided for each to maintain the switch in closed position when the latter is moved to that position by the striker 42. Each latch dog has a nose 89 projecting into the path of a lug 90 on the elevator block, whereby it is tripped to free the elevator switch; and the latch dogs are so arranged as to afford an advanced release of the trip switches, so that an interval occurs between the release of the switch at one side and the re-setting of the corresponding switch at the opposite side no matter in what direction the elevator may be moving. This means that during the period of rest of the elevator the switches, adjacent to the striker 42, are both opened. If the push-rods corresponding thereto be actuated either to repeat a record or to play in succession records on the same level, no movement of the elevator mechanism will occur. This is a feature of importance in connection with our device, as will later appear.

The locating of the reproducer having been completed through the elevator mechanism, it is next in order to provide for the operation of the record spools, and this we accomplish electrically by the following means: On one side of the elevator frame, in line with each point of stoppage of the elevator, we arrange horizontally spaced terminals Q, those at one side of the vertical center being connected in series by conductors R while those at the other side are connected each to the adjacent contact F. A spring contact S, carried on the elevator block, is adapted to close said terminals Q as the elevator block is moved into juxtaposition therewith.

A slight modification of this arrangement is employed in the case of the bottom trip switch where we employ a contact T adapted to be engaged by the switch arm 40 and close a circuit therethrough when the latter is moved downwardly. The contact T is connected with the series joined terminals Q and has a connection with a feed wire U running to the primary coil of a transformer 91, which coil has its other end connected to the main P. The secondary of the transformer is coupled up with a relay magnet 92, the armature of which operates the obstruction 87 which holds the coin in contact with the terminals A and B. Hence, closing of the circuit, through the pair of terminals Q, adjacent a closed control switch 38, as occurs when the elevator stops, sends the current from feeder E to the feed wire U and through the primary coil of the tansformer 91, inducing in the secondary of the transformer a lower potential to operate the relay magnet 92 and drop the coin 86.

The coin falls upon a second obstruction 93, at which position it closes terminals V and W, the first in connection with main C and the latter with a feed wire X running to the arm of a double acting, speed-controlling switch 94 located adjacent to the right hand spool of records, viewing the apparatus from the front. The contacts Y and Z of this switch 94 have connections 95 and 96, respectively, with a second speed-controlling switch 97, located adjacent to the left-hand spool of records; the wire 95 being connected to the switch arm 97 and the wire 96 with one of the contacts 98 of said second switch. The switch 97 is double acting and has two contacts 98 and 99, both in connection through separate conductors 100 and 101, respectively, with one pole of the motor 25 which drives the spool of records, the other pole of said motor being in connection with the main P. The first conductor 100, to which wire 96 is attached, has included in its connection with the motor a resistance coil 102 for cutting down the speed of the motor, while the second named conductor 101, in connection with the contact 99, leads directly to said motor.

The right and left-hand speed-controlling switches are held by springs in contact with the points Y and 98, respectively, and are moved into contact with the opposite points each by means of a vertical rock-shaft 103 adjacent to the series of records carrying a plurality of lugs or pins 104 in position to be engaged by the setting bar 46 on any one of the turntables. A latch device 105 is provided for each rock-shaft 103 to hold the same in position where the switch arms will be in contact with the points Z and 99; the latch on the right being tripped by a beveled projection 106 on the lowermost turntable and that on the left being carried on the armature of a relay magnet 107 and tripped thereby. This magnet has its coil connected through a controlling switch 108 with the secondary of the transformer.

The magnet control switch 108 has its movable contact connected by a wire 109 with one of the conductors leading to the transformer secondary and its stationary contact connected, by a wire 110, with the coil of the relay magnet 107. The movable contact is mounted upon one arm of a rocking bail 111 and is normally held open, being spring-pressed in that direction. The other arm of the bail 111 is connected with a lug on a vertical rock-shaft 112 adjacent to and controlled by the left-hand row of push-rods 39 and acts to close said switch points 108, when any one of the push-rods on that side is actuated, and retain the same closed while the push-rod is depressed.

If a record on the left-hand side is being selected, the magnet controlling switch 108 will be closed immediately upon the inward pressure of a push-rod and, therefore, following the positioning of the elevator mechanism current will pass through the relay magnet 107 from the transformer secondary, drawing its armature inwardly to release the switch arm 97, and allowing the latter to contact with the switch point 98. Thereupon a circuit is established through the resistance coil 102 to operate the motor 25 at a slower speed for turning the record spools through their initial movement.

Near the end of the engaging operation of the reproducer with the record, the setting arm 46, on the turntable being projected, will engage a finger of the rock-shaft 103. thereby moving the switch arm 97 to contacting position with the point 99 where it will be held by the spring-pressed latch 105, thus cutting out the resistance circuit and establishing a direct connection through the motor 25. At this time the reproducer will have been fully positioned upon the record and it is desirable, therefore, to increase the speed for the playing operation. The setting arm 46 will shortly be retracted, as before described, and consequently the switch arm 97 will remain in contact with the point 99 until such time as the relay magnet 107 is again energized, which energization occurs only at the instant before dropping the coin from terminals A and B to terminals V and W.

In case a right-hand push-rod is actuated to select a record, then the magnet controlling switch 108 is left open and no operation of the relay magnet 107 can occur at the end of the elevator operation whereby to release the switch arm 97. The desired reduction of speed is then obtained by reason of the switch arm 94 at the right-hand side, which is normally in contact with the point Y, closing thereby a direct circuit to the motor 25, through the switch arm 97 and contact 99, but only for an instant or until the trip bar 46 on the right-hand spool is thrust out by the switch lever 49 and engages a finger on the right-hand rock shaft 103, which, unlike the left-hand rock shaft 103, is positioned near the beginning of the projected movement of the setting bar 46.

Thus the switch arm 94 is thrown, at the initial period of movement of the records, to engage the contact Z and close the circuit to the motor 25 through contact 98 and coil 102. This circuit will continue for almost a complete revolution of the record or until lug 106, on the lowermost turntable, strikes the latch 105 and releases the rock-shaft 103 allowing it to be retracted, thereby shifting the switch arm 94 to contacting position with the point Y; this occurring shortly after the engaging action of the reproducer on the record has been completed.

At the completion of the playing, the reproducer is moved out, as before described, by means of the universal groove 60 in the record and the spiral cam 58, which outward movement of the reproducer actuates the adjacent arm 79 on the rock-shaft 78, thereby releasing the locking mechanism on the depressed push-rod and throwing the abutment block 65 to position for locking the vertical rock-shafts 62 and consequently the push-rods against inward movement. By reason of a connection 113, between the slide bar 75 and obstruction device 93, we obtain at this time an actuation of the latter to release the coin and thus break the electric circuit through the terminals V and W, thereby stopping the motor 25 and the turntables.

In the practical operation of the device herein described, the coin first strikes the trip 85 which releases the push-rods 39 and then closes the contacts A and B where the coin is retained by means of the abutment device 87. The player actuates the push-rod corresponding to the record he wishes to be played and such rod is automatically locked in its depressed position by the slide bar 69, thus closing one of the switches 38. Current then passes from main C, through the contacts A and B, thence, by wire D to closed switch arm 38, from which it passes to the closed elevator trip switch 40—41 in parallel connection therewith. The current now passes into wire J or M which joins the contacts of switches 40—41 in series and thence out through motor 35 or 36 and by wire O to return main P. This circuit will continue until the elevator block trips the operative switch 40—41, following which a contact is made between the terminals Q, whereupon a circuit is established through wire U to the primary of the transformer 91 and out, as above.

The secondary of the transformer is thus energized to actuate the magnet 92 which throws the abutment device 87, thereby releasing the coin and allowing the same to drop and close the contacts V and W in the slot. Coincident with the actuation of the magnet 92 the magnet 107 will also be actuated, in the event a left-hand push-button has been depressed, to close the switch 108 and thereby the switch arm 97 will have been released to make contact with the switch point 98 of the left-hand speed-controlling switch. The circuit will then be through the closed contacts V and W which are connected to the main C and also to the feeder X running to the switch arm 94, adjacent to the right-hand spool of records, which switch is normally closed through the contact Y connected to the opposite switch arm 97. The circuits will thus pass through the resistance coil 102 to the motor 25 and out through the return main P, thereby causing both spools of records to be turned at a decreased speed. The initial rotation of the records will cause an inwardly directed cam 44 to engage with the switch lever 49 in connection with the push-rod depressed, drawing the said cam to projected position where it will engage with the cross-arm 54ª on the reproducer and move the latter inwardly to playing position with the record. The projected setting arm 46 in passing around will strike a finger on the rock-shaft 103 adjacent thereto and actuate the same to reset the switch arm 97 in contact with the point 99, thus establishing a new circuit direct to the motor 25 and cutting out the resistance coil 102, whereupon the speed of rotation of the records will increase the desired amount for playing.

Shortly thereafter, the setting arm 46 will be tripped and moved to retracted position, and, as previously described, the switch lever 49 will, on account of its automatic action, have been shifted to inoperative position by the passage of the setting arm 46 thereover. If, for instance, a right-hand record has been selected, then the relay magnet 107 will not be actuated on account of the switch 108 remaining broken, so that switch arm 97 will remain in contact with the point 99 of the left-hand speed-controlling switch. Thereafter, the initial turning of the records will be at the usual rate of speed, owing to the position of the switch arm 94 at the right-hand side which normally is in contact with the point Y. However, a slight movement of the records and the turntables will bring a setting bar 46 into engagement with the rock-shaft 103, turning the latter to shift the switch arm 94 into contact with the opposite point Z thereon, whereupon an operative circuit is completed through the wire 96, switch contact 98 and resistance coil 102 to the motor 25, resulting in the desired reduction of speed to permit the reproducer to be properly shifted into playing engagement with the record.

A projection 106 on the lowermost turntable at the right-hand side will trip the latch 105 after about one revolution of the records and thus release the switch arm 94, allowing the same to be drawn into contacting position with the switch point Y, thus effecting a circuit through the motor 25 and which cuts out the resistance coil 102 and so obtains the proper increase in speed of the records for playing purposes.

The playing will thus continue at proper speed until the needle reaches the universal groove 60 on the record, whereupon the reproducer will be drawn into position where the cross-arm 54ª thereon will engage with the outwardly directed spiral cam 58, which automatically acts to shift the tone arm back to neutral position upon the bracket 29ª. Coincident with the return of the tone arm the lug 81 thereon will strike one of the arms 79, shifting it inwardly to cause the release of the locking bar 69 and movement of the abutment device 93 to drop the coin, which operation also sets the locking dog 65 to again lock the push-rods in outward position through the agency of the rock-shafts 62.

In the usual operation of phonographs, the stylus is inclined from the vertical and the record rotated in a direction away from the head or point of the stylus. It will be noted in our device that the records on the right-hand spool turn toward the head of the needle or stylus, which operation is necessary in order to secure a double arrangement of the spools. However, this is not in the least objectionable, inasmuch as the diamond or ball points are employed which permit this action, a capability not generally recognized heretofore.

In practice, the push-rods will be provided adjacent to each with a label containing the name of the record corresponding thereto, and any one of such records may be operated, as desired, giving a wide variety to select from. In prior devices having double tiers of records the selection has been limited to one side at a time, thus decreasing by one half the variety of records to be selected. In our device any one record or records on one side may be played or records played in succession, and where one record of the entire lot happens to enjoy greater popularity than the others, this phase of the operation is decidedly advantageous.

The coin slot 84 preferably extends to the top of the cabinet and is provided with detecting means 114 at its upper end for rejecting spurious coins. By having the slot so elevated an increased falling distance is allowed the coin which insures actuation of the trip device 85 at all times and the consequent unlocking of the push-rods.

Among the advantages of our device to be borne in mind may be mentioned the adjustment of the speed of the records through the friction drive mechanism 22 and 23 and the reduction of the initial speed of the records through the resistance coil 102, which latter permits a practical, automatic connection of the reproducer with the record.

It will be readily appreciated that the ordinary speed of travel of the record is too great to permit connection of the reproducer therewith with safety, and in practice a speed reduction of as much as 50% would have to be provided for to obtain a proper and safe engagement of the parts. The universal groove 60 provided in each of the records insures a complete playing of the records prior to the automatic disengagement, regardless of the size of the record or the number of playing grooves thereon. Prior devices of this nature have been objectionable from the fact that a fixed point of disengagement of the reproducer allows, in some instances, a too prolonged non-playing engagement between the needle and the record at the finish, while in other instances the disengagement of the reproducer would take place previous to the completion of the playing.

Having thus described our invention, what we claim and desire to secure by Letters Patent is:

1. A phonograph having a plurality of rotatable records carried in fixed position one above the other, a vertically movable reproducer, means for raising and lowering said reproducer into juxtaposition with any one of said records, and means for moving the reproducer into playing position with a juxtaposed record.

2. A phonograph having a plurality of rotatable records carried in a fixed position, a reproducer, means for moving the reproducer into playing position with any one of said records, and selective setting means for controlling the operation of said first-mentioned means.

3. In a phonograph, a series of rotatable disk records carried one above the other, a vertically movable reproducer, and automatic means for raising and lowering said reproducer into juxtaposition with any one of said records.

4. In a phonograph, a series of rotatable disk records carried one above the other, a vertically movable reproducer, automatic means for raising and lowering said reproducer into juxtaposition with any one of said records, and selective setting means for controlling the operation of said raising and lowering means.

5. In an automatic phonograph, a plurality of vertical tiers of rotatable disk records spaced edgewise apart, a reproducer between said tiers, and means for shifting said reproducer into and out of playing engagement with any one of said records.

6. In an automatic phonograph, a plurality of rotatable disk records spaced edgewise apart, a reproducer between said records, means for shifting said reproducer into and out of playing engagement with any one of said records, and selective setting means for controlling the operation of said shifting means.

7. In an automatic phonograph, a plurality of series of rotatable disk records arranged in vertical spools spaced apart, a reproducer between said spools movable up and down into juxtaposition with any one of said records, and means for shifting the reproducer into playing engagement with the juxtaposed record.

8. In an automatic phonograph, a plurality of series of rotatable disk records arranged in vertical spools spaced apart, a reproducer between said spools movable up and down into juxtaposition with any one of said records, means for shifting the reproducer into playing engagement with the juxtaposed record, and selective setting means for controlling the vertical movement of said reproducer and the operation of said shifting means.

9. In an automatic phonograph, a series of rotatable disk records carried in fixed position one above the other, a reproducer, means for positioning the reproducer vertically with respect to any one of said records, and means for positioning the reproducer horizontally into playing position with the records.

10. In an automatic phonograph, a series of rotatable disk records carried in fixed position one above the other, a reproducer, means for positioning the reproducer vertically with respect to any one of said records, means for positioning the reproducer horizontally into playing position with the records, and selective setting means for controlling the operation of said parts.

11. In a phonograph, a plurality of series of rotatable disk records arranged in vertical spools spaced apart, a reproducer between said spools, and an automatic electrically operated elevator mechanism for moving said reproducer up and down into juxtaposition with any one of said records.

12. In a phonograph, a plurality of series of rotatable disk records arranged in vertical spools spaced apart, a reproducer between said spools, an automatic electrically operated elevator mechanism for moving said reproducer up and down into juxtaposition with any one of said records, and means rotatable with the records for shifting said reproducer into playing position.

13. In a phonograph, a plurality of series of rotatable disk records arranged in vertical spools spaced apart, a reproducer between said spools, an automatic electrically operated elevator mechanism for moving said reproducer up and down into juxtaposition with any one of said records, means rotatable with the records for shifting said reproducer into playing position, and selective setting means in common for the elevator and shifting mechanism whereby to control the operation of said parts.

14. In a phonograph, a series of rotatable disk records arranged in a vertical spool, a reproducer movable up and down into juxtaposition with any one of said records, and coin controlled means for controlling the vertical movement of said reproducer and rotatable movement of said records, whereby the two operations occur in sequence.

15. In a phonograph, a plurality of rotatable disk records spaced apart and turnable in the same direction, and a reproducing stylus arranged between said records and engageable with either record at adjacent sides thereof.

16. In a phonograph, rotatable disk records spaced apart and turnable in the same direction, and a reproducer arranged between said records and engageable with a record at either side, said reproducer carrying an inclined stylus, whereby the record at one side rotates in a direction toward the head of the stylus.

17. In a phonograph, a series of rotatable disk records arranged in a vertical spool, a reproducer automatically movable into playing position with any one of said records, selective setting means for the adjusting mechanism, and a coin operated means for controlling the movement of the reproducer and the records.

18. In a phonograph, a series of rotatable disk records arranged in a vertical spool, a reproducer automatically movable into playing position with any one of said records, selective setting means for the adjusting mechanism, a coin operated means for controlling the movement of the reproducer and the records, and locking means for the setting means controlled also by said coin operated means.

19. In a phonograph, a series of rotatable disk records arranged in a vertical spool, a reproducer movable up and down into playing position with any one of said records, elevator mechanism for moving said reproducer vertically in either direction, electric driving means for the elevator and for the records, and means operated by a coin for controlling the operation of said driving means.

20. In a phonograph, a series of rotatable disk records arranged in a vertical spool, a reproducer movable up and down into playing position with any one of said records, elevator mechanism for moving said reproducer vertically in either direction, electric driving means for the elevator and for the records, and means operated by a coin for closing the circuit through the driving means for the elevator and the driving means for the records in sequence.

21. In a phonograph, a series of rotatable disk records arranged in a vertical spool, a reproducer movable up and down into playing position with any one of said records, elevator mechanism for moving said reproducer vertically in either direction, electric driving means for the elevator and for the records, means operated by a coin for controlling the operation of said driving means, and means for automatically discontinuing the operation of said driving means on the completion of their respective movements.

22. In a phonograph, a series of rotatable disk records arranged in a vertical spool, a reproducer movable up and down into juxtaposition with any one of said records, elevator mechanism for moving said reproducer vertically, electric driving means for the elevator, and a plurality of switches positioned with respect to the records for controlling the circuit through said driving means to cause a selective positioning of said reproducer.

23. In a phonograph, a series of rotatable disk records arranged in a vertical spool, a reproducer movable up and down into juxtaposition with any one of said records, elevator mechanism for moving said reproducer vertically, electric driving means for the elevator, a plurality of up-going trip switches and a plurality of down-going trip switches for the elevator positioned with respect to the records, and a plurality of control switches for closing the circuit through the driving means whereby upon the manipulation of a particular trip switch by the elevator the circuit will be broken to effect the desired positioning of the reproducer.

24. In a phonograph, a series of rotatable disk records arranged in a vertical spool, a reproducer movable up and down into juxtaposition with any one of said records, elevator mechanism for moving said reproducer vertically, electric driving means for the elevator, a plurality of up-going trip switches and a plurality of down-going trip switches for the elevator positioned with respect to the records, and a plurality of control switches for closing the circuit through the driving means whereby upon the manipulation of a particular trip switch by the elevator the circuit will be broken to effect the desired positioning of the reproducer, and a push rod for each of said control switches projecting at the front of the phonograph housing and forming selective setting means for the elevator mechanism.

25. In a phonograph, a plurality of disk records, a reproducer therefor, and rotatable means movable with each record and engageable with the reproducer for shifting the latter from non-playing position outside of the periphery of the record into playing position with the record.

26. In a phonograph, a plurality of disk records, a reproducer therefor, and rotatable means movable with each record and engageable with the reproducer for shifting the latter from non-playing position outside of the periphery of the record into playing position with the record, said means being also operable to return the reproducer to its original position at the completion of playing.

27. In a phonograph, a plurality of disk records, a reproducer therefor, and rotatable means for shifting the reproducer into and out of playing position with the records, said means comprising an inwardly directed cam and an outwardly directed cam, both rotatable with the record.

28. In a phonograph, a series of rotatable disk records arranged in vertical spools spaced apart, a reproducer movable up and down between said spools, and rotatable means carried adjacent the records for shifting the reproducer into and out of playing position therewith, said means comprising an inwardly directed cam and an outwardly directed cam for each record, said inwardly directed cam being normally retracted, and selective setting means for the inwardly directed cams to cause any one of the same to engage the reproducer when the latter is in neutral position.

29. In a phonograph, a series of rotatable disk records arranged in vertical spools spaced apart, a reproducer movable up and down between said spools, and rotatable means carried adjacent the records for shifting the reproducer into and out of playing position therewith, said means comprising an inwardly directed cam and an outwardly directed cam for each record, said inwardly directed cams being normally retracted, and selective setting means for the inwardly directed cams to cause any one of the same to engage the reproducer when the latter is in neutral position, said records each having a special cut groove adjacent its axis communicating with the inner end of the playing groove whereby to bring the reproducer into juxtaposition with the outwardly directed cam regardless of the playing length of the record.

30. In a phonograph, a plurality of vertically spaced, rotatable disk record-supporting tables, a reproducer, an inwardly directed cam carried on the underside of the upper one of said tables, means on the reproducer engageable by said cam to cause said reproducer to be shifted into playing position with a record on the table beneath, said cam being normally retracted at its outer end to clear the engageable means on the reproducer, and a manually controlled switch device for withdrawing the cam into engaging position with the reproducer.

31. In a phonograph, a plurality of vertically spaced, rotatable disk record-supporting tables, a reproducer, an inwardly directed cam carried on the under side of the upper one of said tables, means on the reproducer engageable by said cam to cause said reproducer to be shifted into playing position with a record on the table beneath, said cam being normally retracted at its outer end to clear the engageable means on the reproducer, a manually controlled switch device for withdrawing the cam into engaging position with the reproducer, means for locking said cam in projected position, and a trip device for the locking means operable when the reproducer has been shifted.

32. In a phonograph, a series of rotatable disk records, a reproducer therefor, driving means for the records, means rotatable with the records to engage the reproducer and move it into playing position, and automatic means for controlling the speed of said driving means whereby to obtain a decreased speed of the records, during the period of shifting of the reproducer.

33. In a phonograph, a series of rotatable disk records, a reproducer therefor, means adjacent each record and rotatable therewith for automatically shifting the reproducer into playing position, electric driving means for said records, and means for cutting down the initial speed of the electric driving means whereby to obtain a decreased speed of rotation of the records, during the period of engagement of the reproducer with the records.

34. In a phonograph, a series of rotatable disk records, a reproducer therefor, means adjacent each record and rotatable therewith for automatically shifting the reproducer into playing position, electric driving means for said records, a resistance circuit in parallel with the electric driving means for operating the latter at a decreased speed, a switch for controlling the connections of said circuits, and means rotatable with the records to set said switch to cut out the resistance circuit at a time after the reproducer is in engagement with a record.

35. In a phonograph, a series of rotatable disk records, a reproducer therefor, means adjacent each record and rotatable therewith for automatically shifting the reproducer into playing position, electric driving means for said records, a resistance circuit in parallel with the electric driving means for operating the latter at a decreased speed, a switch for controlling the connections of said circuits, and means operable upon the initial movement of the records to move said switch to position for cutting in the resistance circuit, and means operable upon the advance movement of said records to trip the switch and cut out said resistance circuit.

36. In a phonograph, a plurality of rotatable disk records, a reproducer therefor, means adjacent each record and rotatable therewith for shifting the reproducer into playing position with the respective record, a motor for driving said records, a resistance circuit in parallel with the motor circuit, a switch for controlling the connection of said circuits, a latch device for normally holding the switch to cut out the resistance circuit, a magnet for actuating said latch device, and means for establishing a circuit through said magnet in advance of the operation of said motor whereby to release the latch device and permit the switch to move to position for cutting in the resistance circuit, and means rotatable with the records for actuating the switch to cut out the resistance circuit after the reproducer is in playing position with a record.

37. In a phonograph, a series of rotatable disk records arranged in vertical spools, a reproducer therefor, automatically operable positioning means for the reproducer and selective setting means for said positioning means.

38. In a phonograph, a series of rotatable disk records arranged in vertical spools, a reproducer therefor, automatically operable positioning means for the reproducer and selective setting means for said positioning means, and locking means for said setting means releasable by a coin.

39. In a phonograph, a series of rotatable disk records arranged in vertical spools, a reproducer therefor, automatically operable positioning means for the reproducer and selective setting means for said positioning means, said setting means comprising a series of push rods corresponding to the records, and means for locking any one of said rods in depressed position to maintain said positioning means operable.

40. In a phonograph, a series of rotatable disk records arranged in vertical spools, a reproducer therefor, automatically operable positioning means for the reproducer and selective setting means for said positioning means, said setting means comprising a series of push rods corresponding to the records, and means for locking any one of said rods in depressed position to maintain said positioning means operable, said locking means acting also to lock the remaining rods against actuation during the period of operation of the phonograph.

41. In a phonograph, a series of rotatable disk records arranged one above the other, a reproducer positioning means for the reproducer, automatic shifting and returning mechanism for the reproducer, selective setting means for said positioning means and shifting mechanism, comprising a series of push rods one for each record, means for locking said push rods against actuation, said locking means being releasable by a coin, means for locking any one of said push rods in depressed position to maintain the parts operable, and means operable by the return of the reproducer for releasing said last-mentioned locking means.

42. In a phonograph, a vertical spool of rotatable disk records, a reproducer therefor, positioning means for the reproducer, separate electric driving means for the records and positioning means, and a coin controlled circuit for each of said driving means.

43. In a phonograph, a vertical spool of rotatable disk records, a reproducer therefor, positioning means for the reproducer, separate electric driving means for the records and positioning means, a coin controlled circuit for each of said driving means, spaced terminals in the circuit of each of said driving means located one above the other and adapted to be closed by a coin, and means for controlling the position of said coin to close said circuits in sequence.

44. In a phonograph, a vertical spool of rotatable disk records, a reproducer therefor, positioning means for the reproducer, separate electric driving means for the records and positioning means, a coin controlled circuit for each of said driving means, spaced terminals in the circuit of each of said driving means located one above the other and adapted to be closed by a coin, an abutment device for each of said spaced terminals adapted to hold the coin in position, and a magnet for actuating the first abutment device to release the coin and allow it to drop to position for closing the second set of terminals.

45. In a phonograph, a series of rotatable disk records spaced one above the other, a reproducer therefor, electric elevator mechanism for positioning said reproducer with respect to any one of said records, means adjacent each record and rotatable therewith for shifting the reproducer into and out of playing position with its respective record, an electric motor for driving the elevator mechanism, an electric motor for driving the records, a coin slot for said phonograph, spaced terminals in said coin slot in circuit with each of said motors, the terminals for the elevator operating motor being arranged above the terminals for the record driving motor, an abutment device arranged adjacent to each set of terminals for retaining a coin in position between to close the circuit, a magnet having its circuit closed by the final position of the elevator mechanism to actuate the first abutment device and allow the coin to fall into engagement with the second set of terminals, and means operable by the return movement of the reproducer to actuate the second abutment device and break the circuit through the record driving motor.

46. In an automatic phonograph, two spools of disk records arranged vertically and spaced apart, a reproducer between said spools, an electric motor for raising said reproducer, an electric motor for lowering said reproducer whereby to position the same adjacent any one of said records, and means adjacent each record for setting either of said motors in operation to move the reproducer into the desired position.

47. In an automatic phonograph, two spools of disk records arranged vertically and spaced apart, a reproducer between said spools, an electric motor for raising said reproducer, an electric motor for lowering said reproducer whereby to position the same adjacent any one of said records, means adjacent each record for setting either of said motors in operation to move the reproducer into the desired position, automatic shifting mechanism for each record to engage and disengage the reproducer therewith, and a third motor for operating said records and shifting mechanism, said shifting mechanism being controllable also by said setting mechanism.

48. In an automatic phonograph, two spools of disk records arranged vertically and spaced apart, a reproducer between said spools, an electric motor for raising said reproducer, an electric motor for lowering said reproducer whereby to position the same adjacent any one of said records, means adjacent each record for setting either of said motors to move the reproducer into the desired position, automatic shifting mechanism for each record to engage and disengage the reproducer therewith, and a third motor for operating said records and shifting mechanism, said shifting mechanism being controllable also by said setting mechanism, and coin operated means for closing the circuit through said motors.

49. In a phonograph, a series of rotatable disk records arranged in a vertically spaced row, a reproducer movable up and down into juxtaposition with any one of said records, elevator mechanism for moving said reproducer vertically, said mechanism comprising a carrier, an operating circuit for driving the carrier in either direction, a normally open control switch corresponding to the various positions of the reproducer, the movable contacts of all of said switches being connected with the operating circuit, a down-going trip switch and an up-going trip switch positioned with respect to each control switch and each having its movable contact connected with the stationary contact of the corresponding control switch, the stationary contacts for said up-going switches being connected with the operating circuit to drive the carrier upward, and the stationary contacts of said down-going switches being connected with the operating circuit to drive the carrier downward, and means on the carrier engageable with each of the trip switches to open the up-going trip switches and close the down-going switches in moving downwardly and close the up-going trip switches and open the down-going trip switches in moving upwardly.

50. In a phonograph, a series of rotatable disk records arranged in a vertically spaced row, a reproducer movable up and down into juxtaposition with any one of said records, elevator mechanism for moving said reproducer vertically, said mechanism comprising a carrier, an operating circuit for driving the carrier in either direction, a normally open control switch corresponding to the various positions of the reproducer, the movable contacts of all of said switches being connected with the operating circuit, a down-going trip switch and an up-going trip switch positioned with respect to each control switch and each having its movable contact connected with the stationary contact of the corresponding control switch, the stationary contacts for said up-going switches being connected with the operating circuit to drive the carrier upward, and the stationary contacts of said down-going switches being connected with the operating circuit to drive the carrier downward, means on the carrier engageable with each of the trip switches to open the up-going trip switches and close the down-going switches in moving downwardly and close the up-going trip switches and open the down-going trip switches in moving upwardly, and means for opening each trip switch in advance of closing the corresponding one, whereby to permanently break the operating circuit when the proper trip switch is actuated.

51. In a phonograph, a series of rotatable disk records arranged in a vertically spaced row, a reproducer movable up and down into juxtaposition with any one of said records, elevator mechanism for moving said reproducer vertically, said mechanism comprising a carrier, an operating circuit for driving the carrier in either direction, a normally open control switch corresponding to the various positions of the reproducer, the movable contacts of all of said switches being connected with the operating circuit, a down-going trip switch and an up-going trip switch positioned with respect to each control switch and each having its movable contact connected with the stationary contact of the corresponding control switch, the stationary contacts for said up-going switches being connected with the operating circuit to drive the carrier upward, and the stationary contacts of said down-going switches being connected with the operating circuit to drive the carrier downward, means on the carrier engageable with each of the trip switches to open the up-going trip switches and close the down-going switches in moving downwardly and close the up-going trip switches and open the down-going trip switches in moving upwardly, means for opening each trip switch in advance of closing the corresponding one, whereby to permanently break the operating circuit when the proper trip switch is actuated, a second circuit for controlling the operation of the records, parallel connections leading from each of the stationary contacts of said control switches forming part of said second circuit, spaced terminals in each of said parallel connections, and means on the carrier for connecting said spaced terminals to close the second circuit when the reproducer has reached the desired position.

52. In a phonograph, a plurality of vertical tiers of rotatable disk records spaced apart, a vertically movable reproducer arranged between said records, means for positioning the reproducer opposite any one of the records, and automatic means for shifting the reproducer from a position outside the periphery of the record into playing engagement therewith.

53. In a phonograph, a plurality of vertical tiers of rotatable disk records spaced apart, a vertically movable reproducer arranged between said records, means for positioning the reproducer opposite any one of the records, automatic means for shifting the reproducer from a position outside the periphery of the record into playing engagement therewith, and automatic means effective upon the completion of the playing to return the reproducer to position outside the periphery of the record.

54. In a phonograph, a plurality of vertical tiers of rotatable disk records spaced apart, a vertically movable reproducer arranged between said records, means for positioning the reproducer opposite any one of the records, and coin controlled means for shifting the reproducer from a point outside the periphery of the record into playing engagement therewith.

In testimony whereof we have hereunto set our hands in the presence of two subscribing witnesses.

JOHN BRIGGS.
JOHN T. JENKINS.

Witnesses:
JOHN H. HERRING,
W. W. HEALEY.